United States Patent [19]
Goeppel

[11] Patent Number: 6,018,781
[45] Date of Patent: Jan. 25, 2000

[54] WORK STATION HAVING SIMULTANEOUS ACCESS TO REGISTERS CONTAINED IN TWO DIFFERENT INTERFACES

[75] Inventor: Anton Goeppel, Burgau, Germany

[73] Assignee: NCR Corporation, Dayton, Ohio

[21] Appl. No.: 07/963,041

[22] Filed: Oct. 19, 1992

Related U.S. Application Data

[63] Continuation of application No. 07/752,727, Aug. 30, 1991, abandoned.

[30] Foreign Application Priority Data

Aug. 31, 1990 [GB] United Kingdom .................... 9018990

[51] Int. Cl.[7] .................................................... G06F 13/00
[52] U.S. Cl. ............................................................ 710/115
[58] Field of Search ............................. 364/252.6, 254.8, 364/DIG. 1; 395/275, 800, 325, 295; 710/115

[56] References Cited

U.S. PATENT DOCUMENTS

| | | | |
|---|---|---|---|
| 3,704,453 | 11/1972 | Blackwell et al. ...................... | 395/275 |
| 3,742,457 | 6/1973 | Calle et al. .............................. | 395/275 |
| 3,997,771 | 12/1976 | Perlowski et al. ..................... | 235/156 |
| 4,079,451 | 3/1978 | Woods et al. ........................... | 364/200 |
| 4,079,455 | 3/1978 | Ozga ....................................... | 395/800 |
| 4,183,089 | 1/1980 | Daughton et al. ...................... | 395/275 |
| 4,217,638 | 8/1980 | Nammoto et al. ...................... | 395/400 |
| 4,361,869 | 11/1982 | Johnson et al. ......................... | 395/400 |
| 4,371,932 | 2/1983 | Dinwiddie, Jr. et al. ............... | 395/275 |
| 4,432,055 | 2/1984 | Salas et al. .............................. | 395/400 |
| 4,447,878 | 5/1984 | Kinnie et al. ........................... | 395/325 |
| 4,490,788 | 12/1984 | Rasmussen .............................. | 395/275 |
| 4,549,263 | 10/1985 | Calder ..................................... | 395/275 |
| 4,623,990 | 11/1986 | Allen et al. ............................. | 365/189 |
| 4,750,107 | 6/1988 | Buggert .................................. | 395/275 |
| 4,866,603 | 9/1989 | Chiba ..................................... | 395/425 |
| 4,870,590 | 9/1989 | Kawata et al. ......................... | 364/468 |
| 4,945,512 | 7/1990 | DeKarske et al. ....................... | 365/49 |
| 4,974,156 | 11/1990 | Harding et al. ......................... | 395/650 |
| 5,062,076 | 10/1991 | Ho et al. ................................. | 395/275 |
| 5,081,573 | 1/1992 | Hall et al. ............................... | 395/800 |
| 5,128,941 | 7/1992 | Russell ................................... | 371/2.2 |
| 5,168,573 | 12/1992 | Fussum et al. ......................... | 395/800 |
| 5,175,863 | 12/1992 | Jones, Jr. ................................ | 395/800 |
| 5,303,344 | 4/1994 | Yokoyana et al. ..................... | 395/200 |
| 5,325,486 | 6/1994 | Omori et al. ........................... | 395/165 |

*Primary Examiner*—Mark H. Rinehart
*Attorney, Agent, or Firm*—Douglas S. Foote; Ying Tuo; Paul J. Maginot

[57] ABSTRACT

A work station which includes a central processing unit (CPU), first and second interface chips connected to respective external or peripheral units, and a local bus connected to the CPU and chips and adapted for multiple byte data communication between the CPU and chips. First and second one-byte registers are included in the first and second chips, respectively, and are simultaneously accessible by the CPU.

8 Claims, 7 Drawing Sheets

WORK STATION HAVING SIMULTANEOUS ACCESS TO REGISTERS CONTAINED IN TWO DIFFERENT INTERFACES

This is a continuation of application Ser. No. 07/752,727 filed on Aug. 30, 1991 now abandoned.

CROSS-REFERENCE TO RELATED APPLICATIONS

"Work Station Having Multiprocessing Capability", U.S. patent application Ser. No. 07/752,747, filed concurrently herewith, invented by Otto Duerrschmid and Edward C. King.

"Work Station or Similar Data Processing System Including Interfacing Means to Microchannel Means", U.S. patent application Ser. No. 07/752,710, filed concurrently herewith, invented by V. Thomas Powell, Anton Goeppel, Edward C. King and G. Roerhl.

"Work Station Including a Direct Memory Access Controller and Interfacing Means to Microchannel Means", U.S. patent application Ser. No. 07/753,273, filed concurrently herewith, invented by Georg Dollinger and Edward C. King.

"Work Station and Method for Configuring Thereof", U.S. patent application Ser. No. 07/752,814, filed concurrently herewith, invented by Anton Goeppel.

"Work Station Interfacing Means Having Burst Mode Capability", U.S. patent application Ser. No. 07/752,383, filed concurrently herewith, invented by Edward C. King and Anton Goeppel.

"Internal Bus for Work Station Interfacing Means", U.S. patent application Ser. No. 07/752,377, filed concurrently herewith, invented by Edward C. King and Anton Goeppel.

"Work Station Architecture With Selectable CPU", U.S. patent application Ser. No. 07/752,819, filed concurrently herewith, invented by Edward C. King and Anton Goeppel.

"Work Station Having Multiplexing and Burst Mode Capabilities", U.S. patent application Ser. No. 07/752,407, filed concurrently herewith, invented by Anton Goeppel and Edward C. King.

"Work Station Including a Direct Memory Access Controller", U.S. patent application Ser. No. 07/752,815, filed concurrently herewith, invented by Anton Goeppel.

BACKGROUND OF THE INVENTION

1. Field of the Invention

This invention relates to a work station or similar data processing system of the kind including a central processing unit (CPU). More particularly, it relates to an architecture for transferring data to and from I/O (Input/Output registers in the data processing system.

Known work stations use a specific CPU, e.g. an Intel 80386 microprocessor provided on a system board together with other chip units, such as memories, various peripheral interfaces and a system bus controller. The CPU and the above mentioned units communicate with each other, partially through buffers, over a local bus comprising control, address and data lines, all units being under tight control of the CPU through the local bus. In general, the system design is tailored for a specific CPU. This means that a large variety of different chip unit designs are required for work stations using different CPUs. The local bus also is tailored for the specific configuration. In order to maintain compatibility with other systems, detailed specifications rigidly determine the features and functions of the various units and their I/O registers. Thus, it is difficult to modify the system for expansion and improved performance.

Within the context of existing computer systems, a number of addresses are typically reserved for I/O registers. These addresses are not available for system memory and are generally limited in number. In addition to having a limited number of I/O addresses available, modern computer designs must also be compatible with software that writes multiple bytes of data to respective I/O registers at the same time.

OBJECTS OF THE INVENTION

It is an object of the present invention to provide a new and improved work station with I/O registers distributed among multiple interface chips.

It is another object of the present invention to provide a work station which efficiently uses I/O registers available in interfacing chips.

It is a further object of the present invention to provide a work station with distributed I/O registers and which is compatible with software that simultaneously writes multiple data bytes to respective ones of the registers.

SUMMARY OF THE INVENTION

One form of the present invention is a work station which includes a central processing unit (CPU). The work station includes first and second interface chips connected to respective external or peripheral units, and a local bus connected to the CPU and chips and adapted for multiple byte data communication between the CPU and chips. First and second one-byte registers are included in the first and second chips, respectively, and are simultaneously accessible by the CPU.

The subject work station includes highly integrated functional blocks provided with some intelligence and containing register means. The work station is capable of operating with various types of CPU. Each functional block serves as an active interface either for memory control (MIB), microchannel bus control (BIB) or local peripheral control (PIB). One or a plurality of MIBs or BIBs and one PIB communicate through a local bus with a selected CPU. The local bus is specifically extended as compared with the local bus of known work stations and provides more flexibility and improved performance by providing for simultaneous access to registers included in two of the functional blocks as the PIB and BIB.

One embodiment of the invention will now be described by way of example with reference to the accompanying drawings.

DESCRIPTION OF A PREFERRED EMBODIMENT

Figure 1:
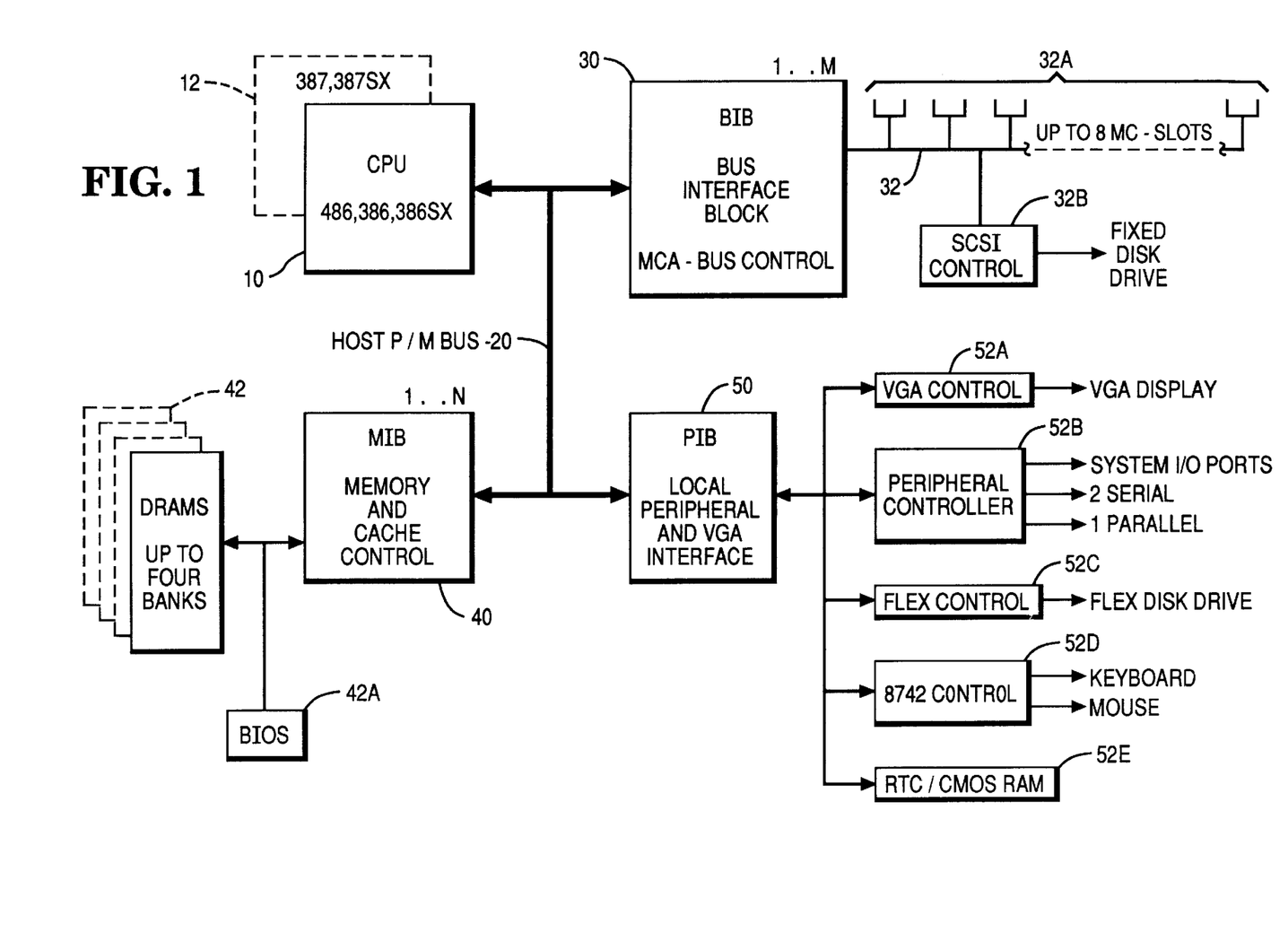
FIG. 1 is a schematic overall view of an embodiment of a work station according to the invention illustrating the various functional blocks and the connections therebetween.
Figures 2, 2E:
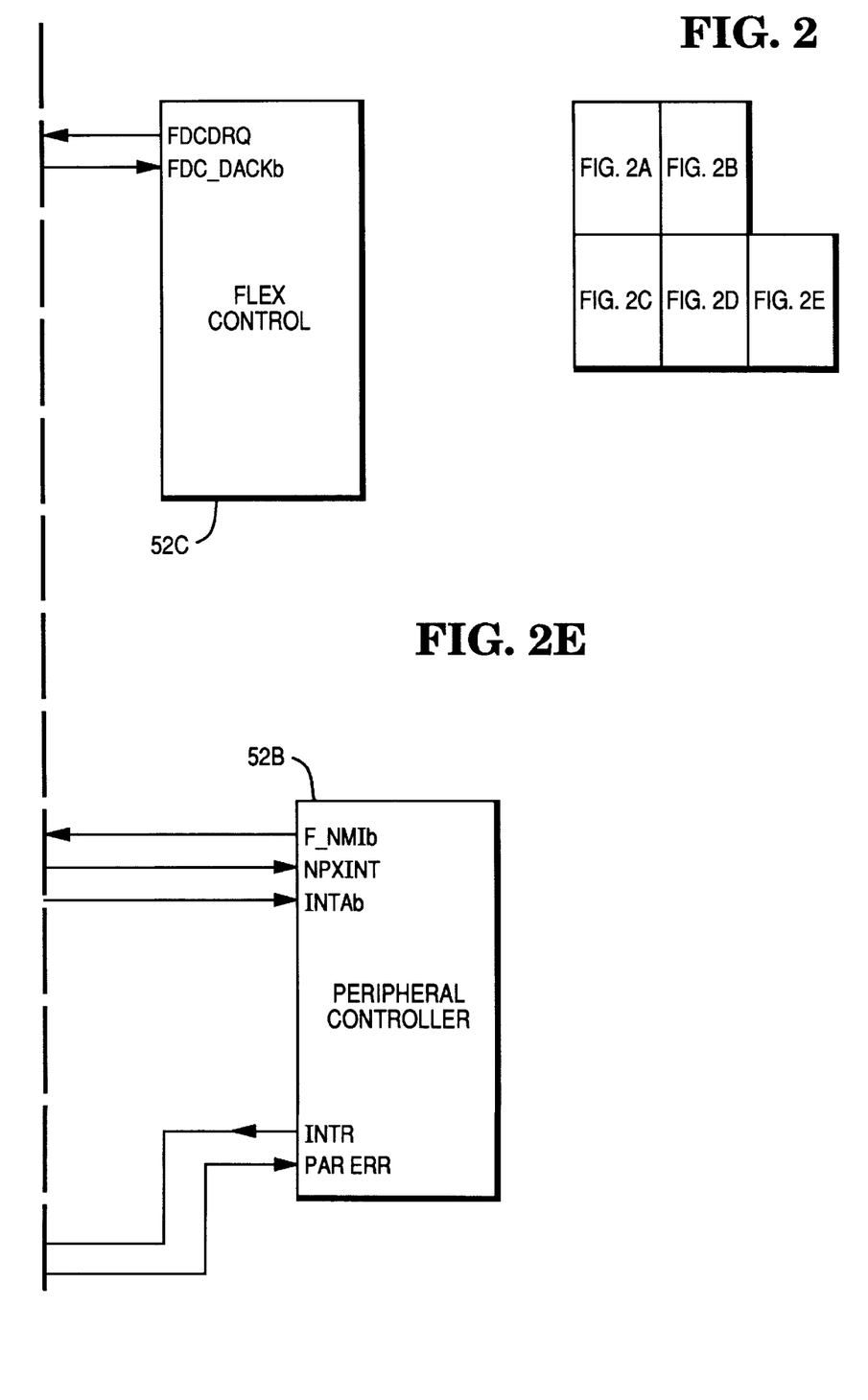
FIGS. 2A to 2E, arranged as shown in FIG. 2, are a schematic drawing showing in detail a host P/M (Processor/Memory) bus as used to connect the various functional blocks with each other.
Figure 2A:
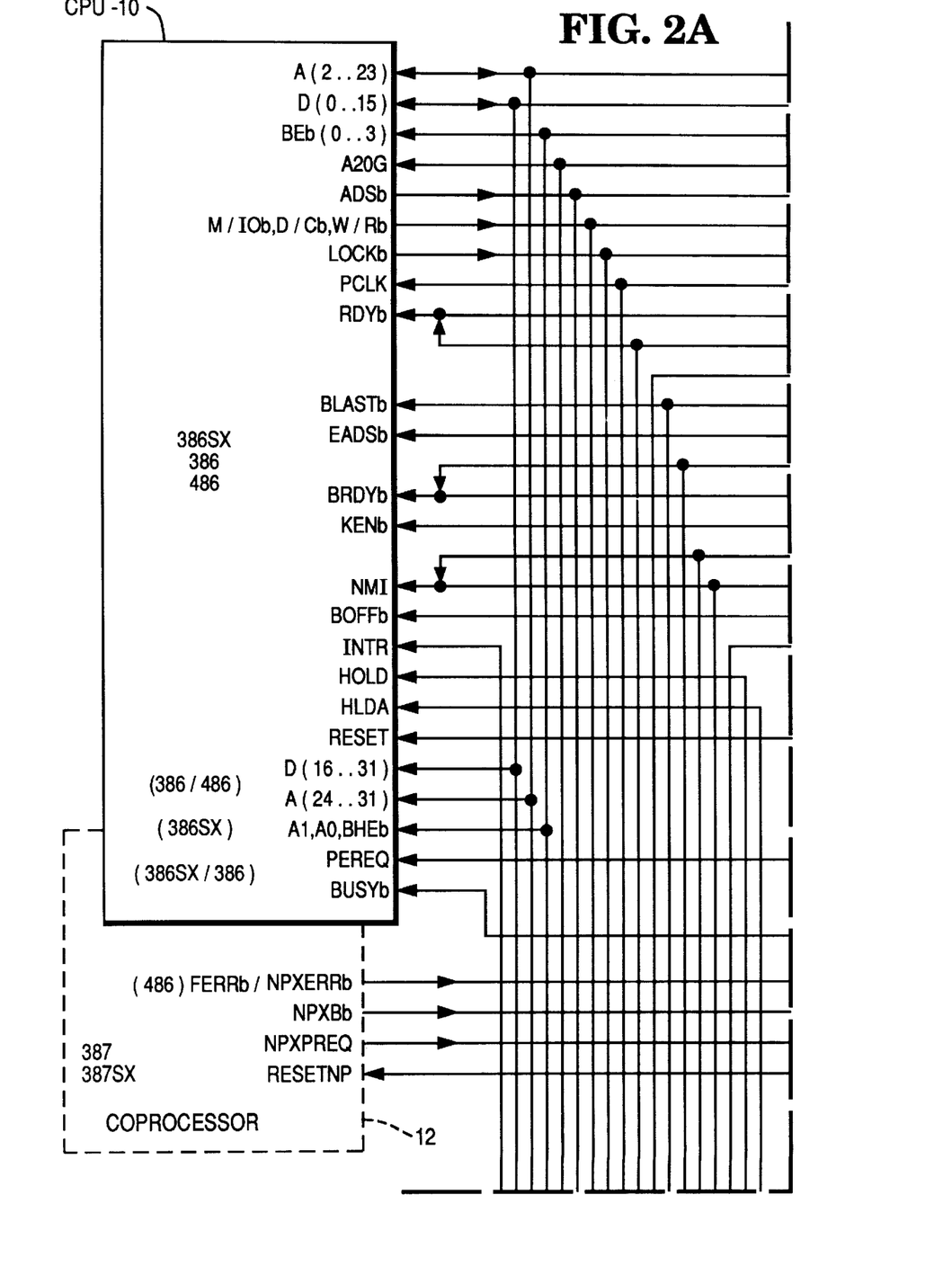
Figure 2B:
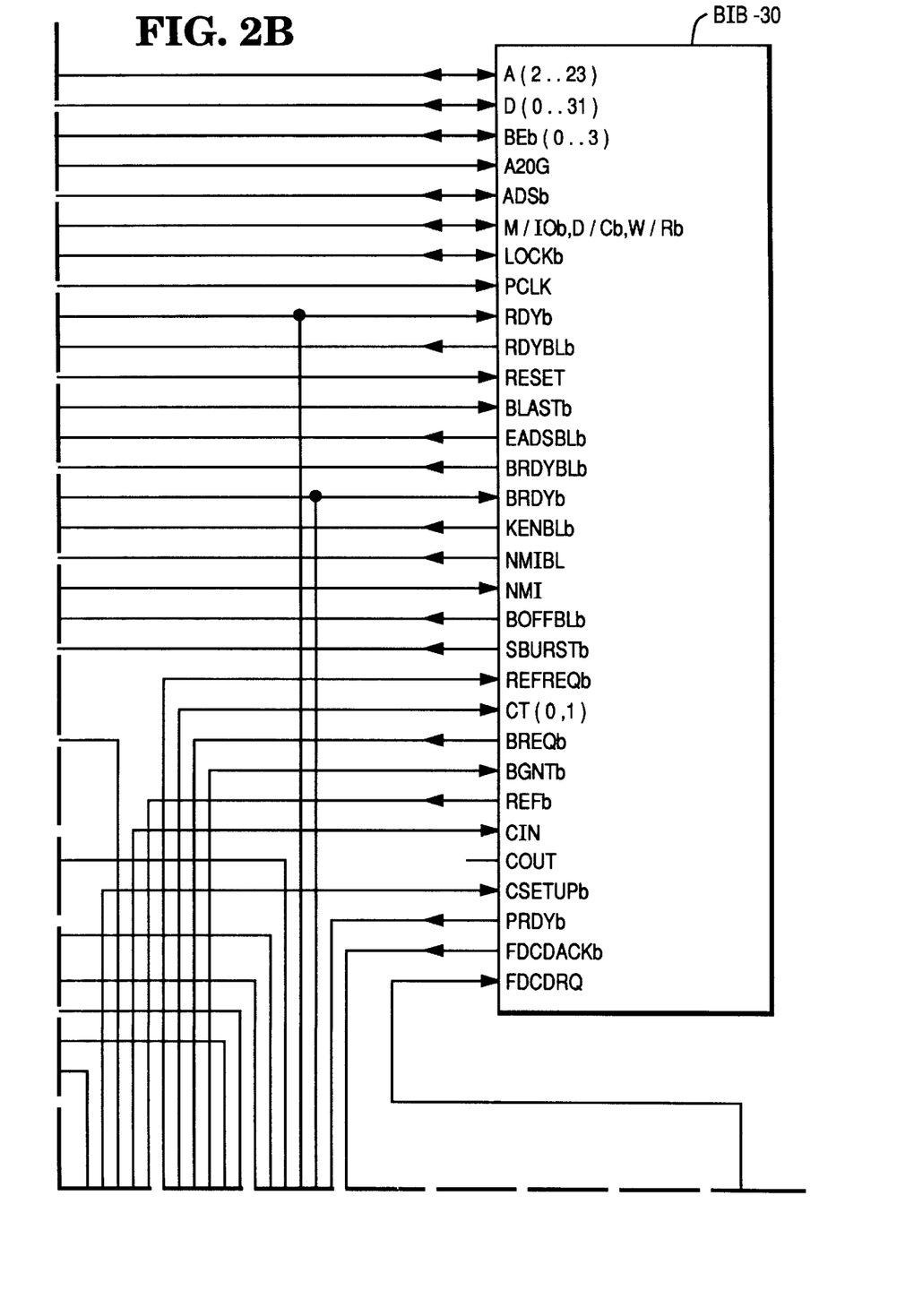
Figure 2C:
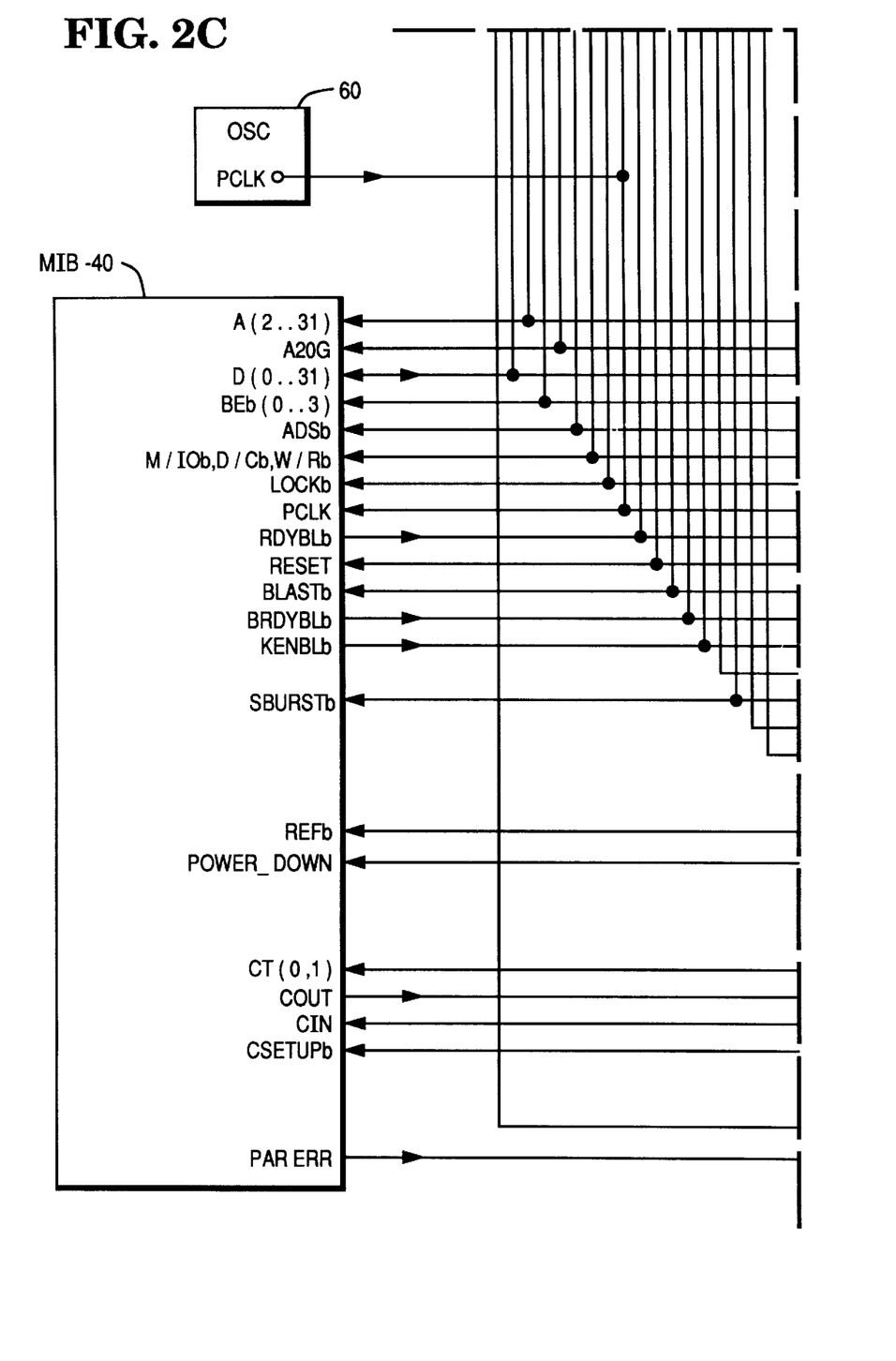
Figure 2D:
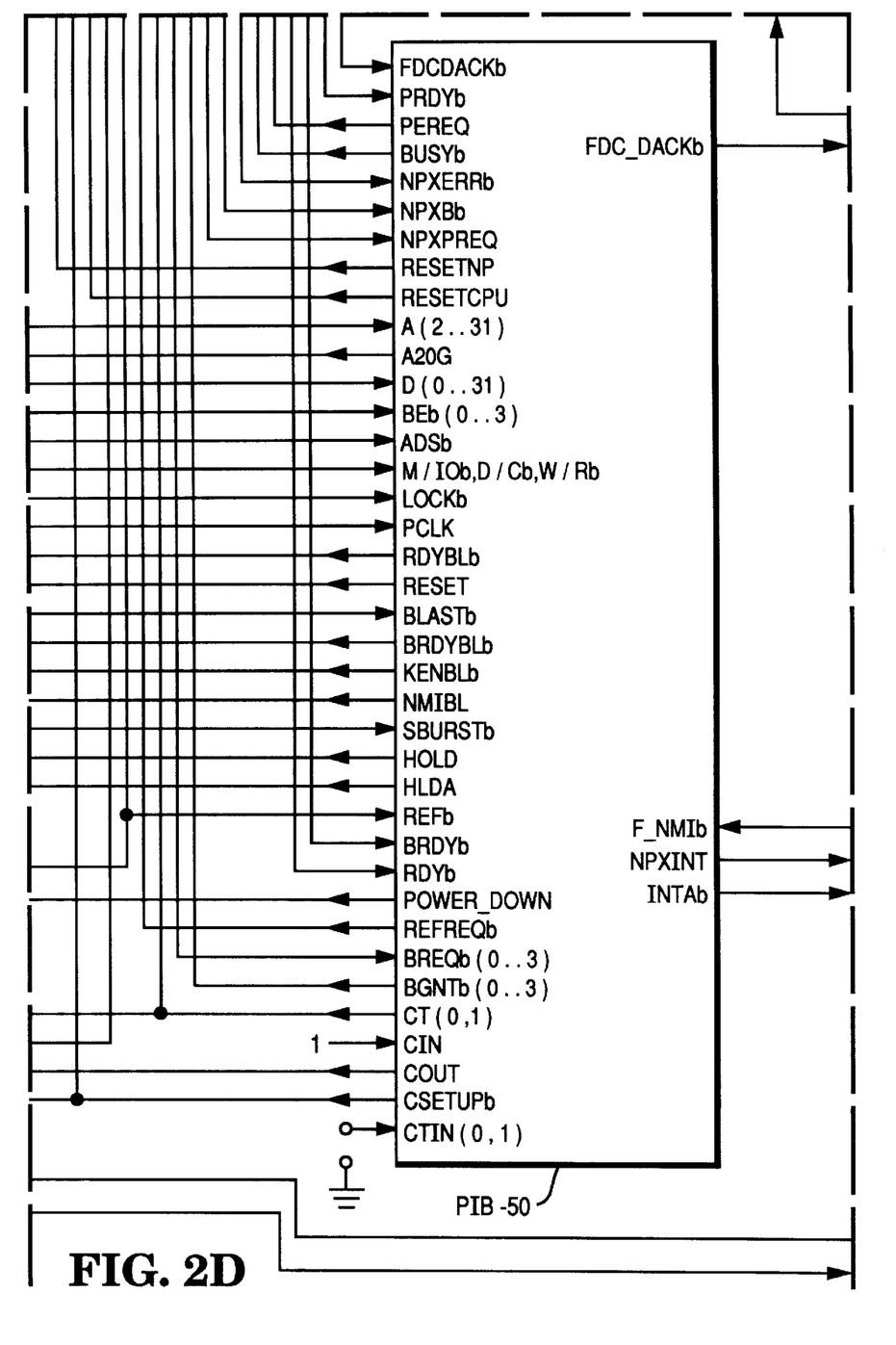

Referring first to FIG. 1, there is shown a preferred embodiment of a work station or data processing system according to the invention. Basically, a CPU 10 communicates through a host P/M bus 20 with functional blocks 30, 40 and 50, and in particular with one or a plurality of bus interface blocks (BIB) 30 for microchannel access, with one or a plurality of memory interface blocks (MIB) 40 for memory and cache control and with a local peripheral and videographics array (VGA) interface block PIB 50. It should be noted that it is possible to provide more than one PIB 30 and more than one MIB 40.

It should be noted that different types of microprocessor may be used for the CPU 10, such as the Intel 80386, 80386SX, and 80486 microprocessors. Also a coprocessor 12 such as a mathematical coprocessor Intel 80387, or 80387SX, may be added.

The functional block BIB 30 is provided as an interface between the host P/M and a microchannel 32 provided with a plurality of slots 32a for attaching conventional adapter boards including adapter boards provided with a microprocessor which may act as a master in communication with other functional blocks of the work station. Furthermore, an SCSI control unit 32b is connected to the microchannel 32 for controlling a fixed disk drive.

The functional block MIB 40 forms an interface between the host P/M bus 20 and a DRAM memory 42 which may have different sizes. Furthermore, MIB 40 controls access to the conventional BIOS ROM memory 42a.

Functional peripheral interface block (PIB) 50 forms an interface between the host P/M bus 20 and various conventional system and peripheral units through control blocks 52a–52e. Thus, there is provided a VGA control 52a, a peripheral controller 52b, a flexible disk control 52c, a keyboard/mouse control 52d, and a RTC/CMOS RAM unit 52e. All these units are well known in the art; therefore, they will not be explained in detail.

Each of the functional blocks BIB 30, MIB 40, and PIB 50 is specifically designed as a single integrated circuit chip containing all the elements such as registers and logic circuitry necessary to establish and perform communication between the host P/M bus 20 and the individual units connected to the functional blocks 30, 40, and 50.

As indicated in FIG. 1 it should be noted that a number of m of BIBs 30 and a number n of MIBs may be provided, individually connected to the host P/M bus 20. Thus, a large variety of configurations having different CPUs and different memory capacities may be implemented.

It should be understood that each functional block 30, 40, 50 is provided with some intelligence offering an operation which is relatively independent from the CPU operation generally governing all functions of the system.

Basically, each functional block 30, 40, 50 includes an interface unit (not shown) disposed between the host P/M bus 20 and an individual internal transaction bus (not shown). Although the timing is based on the CPU clock, all operations within the functional blocks 30, 40, 50, such as read or write operations, are independently performed in one cycle whilst the CPU needs at least two cycles of the CPU clock. Accordingly, this system architecture offers a considerably improved performance in view of the reduction in wait states for the CPU resulting in a higher overall operating speed.

Within the block CPU 10 the conventional input/output ports of a microprocessor such as the Intel 80386, etc. are identified as address ports A(2, . . . 23), data ports D(0, . . . 15), byte enable ports BEb(0, . . . 3), an address status output ADSb which indicates that a valid bus cycle definition and address are available and which is driven active in the same clock as the addresses are driven. ADSb is active low. The system clock PCLK is generated by a clock oscillator 60 and supplied to the input port PCLK of the CPU 10 and the functional blocks BIB 30, MIB 40, and PIB 50. These and all other input/output ports of the CPU 10 and the signals presented there are conventional. Therefore, they will not be explained in detail.

As may be gathered from FIGS. 2A–2E, the functional blocks BIB 30, MIB 40, and PIB 50 are provided with input/output ports similar to those of the CPU. However, there are several additional ports and associated bus lines connecting corresponding ports of the functional blocks and the CPU with each other.

The following ports and corresponding signals are of particular importance:

A31–A2 These are the address lines which, together with the byte enable signals BEb(0, . . . 3) (defined below), define the physical area of memory or input/output space accessed.

D31–D0 These are the data lines of the host P/M bus, the lines D0–D7 defining the least significant byte while lines D24–D31 define the most significant byte of the data bus.

BE0b–BE3b These are four byte enable signals indicating active bytes during read or write cycles. BE3b applies to the most significant data byte D24–D31, BE2b applies to data byte D16–D23, BE1b applies to data byte D8–D15, and BE0b applies to the least significant data byte D0–D7. The byte enable signals are active low, as indicated by the letter b.

RDYb This is a ready signal indicating that the current bus cycle is completed. RDY indicates that a functional block of the system has presented valid data on the data lines of the bus in response to a read request or that a functional block of the system has accepted valid data from the processor in response to a write cycle.

PRDYb This is a common ready signal used when both a PIB block 50 and a BIB block 30 are accessed in a single cycle, as will now be explained.

As previously mentioned, each of the functional blocks, such as the BIB 30 the MIB 40 and the PIB 50, includes a plurality of one-byte length I/O registers which may be accessed for read or write operations by the CPU 10. The provision of 32 data lines in the host P/M bus 20 provides the capability for the CPU 10 to access up to four such one-byte registers simultaneously, the byte enable lines BEb (0 . . . 3) identifying up to four active data bytes. The RDYb signal provided by the accessed block indicates to the CPU 10 that access has been successfully effected.

Normally, simultaneously accessed registers would be located in a single one of the functional blocks 30, 40, 50. However, it may be desirable in some circumstances for the CPU 10 to simultaneously access I/O registers in more than one block. For example, because the number of I/O addresses is generally limited and in order to use all available addresses, registers with the same address but different byte enable lines may be located in different blocks. For reasons of software compatibility, access to such distributed registers must occur at the same time and should be transparent, i.e. the CPU 10 should not be aware that the simultaneously accessed registers are located in different functional blocks.

Figure 3:
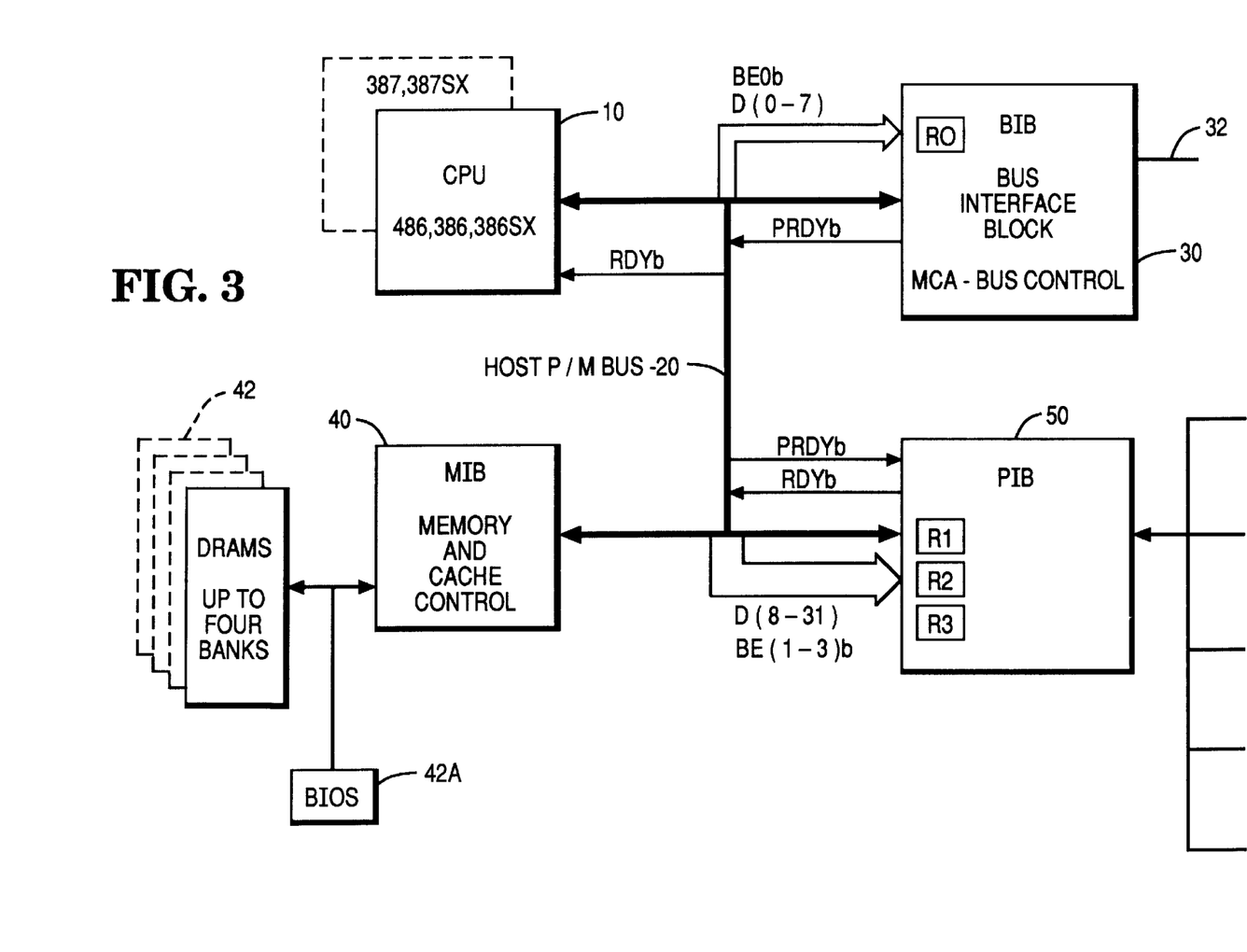
FIG. 3 is a block diagram for explaining a specific feature of the invention.

Referring now to FIG. 3, in one embodiment a one-byte register RO located in the BIB 30 is accessible simultaneously with access to three one-byte registers R1, R2 and R3 located in the PIB 50. Thus, the CPU 10 may transmit data to or receive data from the functional blocks BIB 30 and PIB 50 in a 32 bit or 4-byte parallel mode.

In the example shown in FIG. 3 the CPU 10 accesses register R0 of the BIB 30 for storing therein, or reading therefrom, the least significant data byte D(0 . . . 7) and, simultaneously, registers R1 to R3 of the PIB 50 for storing therein, or reading therefrom, the three data bytes D(8 . . . 15), D(16 . . . 23), and D(24. . . 31).

As indicated in FIG. 3, the selection of the appropriate byte takes place by the signals BE0b for the least significant byte for access to register R0 in the BIB 30 and the byte enable signals BE1b to BE3b for access to registers R1 to R3 in the PIB 50.

It should be noted that in this example, for both read and write cycles, the PIB 50 generates a RDYb signal which is received by the CPU 10. The BIB 30 does not generate such a RDYb signal. Rather, the BIB 30 sends a ready signal PRDYb via the host P/M bus 20 to the PIB 50 in order to indicate to the PIB 50 that it has completed its access function. Thus, since either of the functional blocks BIB 30 or PIB 50 may be slower than the other this PRDYb signal ensures that the RDYb signal is issued by the PIB 50 only after both of the functional blocks 30 and 50 have finished their access operations. It will be appreciated that this arrangement has an advantage in that only a single additional pin is required on each integrated circuit chip embodying a functional block such as the BIB 30 and PIB 50 to provide for RDYb signal generation on the host P/M bus 20 in the case of simultaneous register access in different blocks.

In connection with the embodiment according to FIG. 3 it has been explained that one register R0 in the BIB 30 and three registers R1 to R3 in the PIB 50 may be simultaneously accessed. However, the invention is not restricted to this configuration. Rather, the number of registers and the bytes associated therewith may be accessed in various configurations. Furthermore, registers of other functional blocks, such as the MIB 40 may be used as well. Moreover, multiple byte operation is not restricted to the 4-byte format of the embodiment. Also, it should be understood that the invention is not limited to applications employing 386, 386SX or 486 processors, and that other processor types may be employed.

The detail design of the present invention is captured in CDL, a high level hardware description language. CDL is a software tool which unambiguously defines the hardware for a digital logic system. The attached CDL listing completely defines a preferred embodiment of the present invention. The listing may be compiled to generate a "C" source code which may then be compiled by a C compiler to generate a standardized C Object File Format (COFF). The COFF is then input to a logic synthesis program to provide a detailed logic schematic. A logic synthesis program which may be used for this purpose is SYNOPSYS, available from Synopsys Inc., Mountain View, Calif.

It will be clear to those skilled in the art that the present invention is not limited to the specific embodiment disclosed and illustrated herein. Nor is the term "work station" limited to a particular type of computer, but it is to be interpreted in its broadest sense to include any data processing system.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A work station, including a central processing unit (CPU), said work station comprising:

a first interface chip connected between said CPU and an external unit, said first interface chip including a first register;

a second interface chip connected between said CPU and a peripheral unit, said second interface chip including a second register;

a bus connected to said CPU, said first interface chip and said second interface chip, said bus transferring data between said CPU and said first interface chip, and between said CPU and said second interface chip; and each of said first and second registers being simultaneously accessible by said CPU;

and wherein:

said bus includes address and enable lines; and said first and second registers share common address lines but are connected to different enable lines.

2. A work station, including a central processing unit (CPU), said work station comprising:

a first interface chip connected between said CPU and an external unit, said first interface chip including a first register;

a second interface chip connected between said CPU and a peripheral unit, said second interface chip including a second register;

a bus connected to said CPU, said first interface chip and said second interface chip, said bus transferring data between said CPU and said first interface chip, and between said CPU and said second interface chip; and each of said first and second registers being simultaneously accessible by said CPU;

and wherein said bus includes:

a first ready signal line connected between said first and second interface chips, said first signal line being activated by said second interface chip upon completion of an access to said second register; and a second ready signal line connected between said first interface chip and said CPU, said second signal line being activated by said first interface chip upon completion of an access to said first register and after activation of said first signal line.

3. A work station, including a central processing unit (CPU), said work station comprising:

a first interface chip connected between said CPU and an external unit, said first interface chip including a first I/O register;

a second interface chip connected between said CPU and a peripheral unit, said second interface chip including a second I/O register;

a bus connected to said CPU, said first interface chip and said second interface chip, said bus transferring data between said CPU and said first interface chip, and between said CPU and said second interface chip; and said first and second I/O registers sharing common address lines but being connected to different enable lines, each of said first and second I/O registers being simultaneously accessible by said CPU;

wherein said bus includes:

address and enable lines;

a first ready signal line connected between said first and second interface chips, said first signal line being activated by said second interface chip upon completion of an access to said second I/O register; and a second ready signal line connected between said first interface chip and CPU, said second signal line being activated by said first interface chip upon completion of an access to said first I/O register and after activation of said first signal line.

4. A work station, including a central processing unit (CPU), said work station comprising:

a first interface chip connected between said CPU and an external unit, said first interface chip including a first register;

a second interface chip connected between said CPU and a peripheral unit, said second interface chip including a second register;

a bus connected to said CPU, said first interface chip and said second interface chip, said bus transferring data between said CPU and said first interface chip, and between said CPU and said second interface chip; and each of said first and second registers being simultaneously accessible by said CPU;

and wherein:

said first and second registers share common address lines but are connected to different byte enable lines.

5. A work station according to claim 3, wherein said first and second I/O registers are one-byte registers.

6. A work station according to claim 5, wherein said enable lines are byte enable lines.

7. A work station according to claim 3, wherein each of said first and second I/O registers is simultaneously accessible by said CPU in a single cycle.

8. A work station according to claim 7, wherein each of said first and second I/O registers is simultaneously accessible by said CPU in a write cycle or a read cycle.

* * * * *